United States Patent
Shirai et al.

(10) Patent No.: US 10,259,350 B2
(45) Date of Patent: Apr. 16, 2019

(54) LOCK RELEASE MECHANISM

(71) Applicant: NHK SPRING CO., LTD., Yokohama-shi (JP)

(72) Inventors: Jun Shirai, Yokohama (JP); Koji Matsuyama, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 8 days.

(21) Appl. No.: 15/496,909

(22) Filed: Apr. 25, 2017

(65) Prior Publication Data

US 2017/0313212 A1 Nov. 2, 2017

(30) Foreign Application Priority Data

May 2, 2016 (JP) ................................. 2016-092677

(51) Int. Cl.
| | | |
|---|---|---|
| B60N 2/20 | (2006.01) | |
| B60N 2/90 | (2018.01) | |
| A47C 1/026 | (2006.01) | |
| B60N 2/36 | (2006.01) | |

(52) U.S. Cl.
CPC .............. *B60N 2/20* (2013.01); *A47C 1/026* (2013.01); *B60N 2/366* (2013.01); *B60N 2/90* (2018.02)

(58) Field of Classification Search
CPC ........................................................ B60N 2/20
USPC ............. 297/367 R, 378.12, 378.13, 463.1; 403/316, 70; 292/227, 336.3
See application file for complete search history.

(56) References Cited

U.S. PATENT DOCUMENTS

| | | | | |
|---|---|---|---|---|
| 4,478,445 A * | 10/1984 | Shimizu | .................. | E05B 79/12 |
| | | | | 292/336.3 |
| 5,328,243 A * | 7/1994 | Akiyama | ................. | B60N 2/20 |
| | | | | 292/227 |
| 5,415,491 A * | 5/1995 | Hayakawa | ............... | B60N 2/20 |
| | | | | 24/616 |
| 7,635,166 B2 * | 12/2009 | Ishikawa | ................ | B60N 2/366 |
| | | | | 297/463.1 |
| 7,909,405 B2 * | 3/2011 | Arima | ....................... | B60N 2/20 |
| | | | | 297/378.12 |
| 8,172,327 B2 * | 5/2012 | Lindsay | ................. | B60N 2/366 |
| | | | | 297/378.1 |
| 8,393,682 B2 * | 3/2013 | Hosoda | .................. | B60N 2/366 |
| | | | | 292/216 |
| 8,864,224 B2 * | 10/2014 | Kobayashi | ........... | B60N 2/3011 |
| | | | | 297/113 |
| 2006/0170270 A1* | 8/2006 | Inoue | .................... | B60N 2/3009 |
| | | | | 297/378.12 |
| 2011/0215627 A1* | 9/2011 | Wieclawski | ........... | B60N 2/366 |
| | | | | 297/378.12 |

FOREIGN PATENT DOCUMENTS

| | | |
|---|---|---|
| JP | 2012-116208 A | 6/2012 |
| JP | 2013-203285 A | 10/2013 |

* cited by examiner

*Primary Examiner* — Syed A Islam
(74) *Attorney, Agent, or Firm* — Knobbe, Martens, Olson & Bear, LLP

(57) ABSTRACT

A lock release mechanism comprising: an operation lever provided at a shoulder of a seatback of a vehicle seat, the operation lever being supported to be tiltable in a seat front-and-rear direction about an axis along a seat width direction; a rod, wherein the rod comprises a coupled portion, a main body portion, and a projecting portion; and a width direction limiting portion that limits movement of the rod in the seat width direction relative to the operation lever.

7 Claims, 9 Drawing Sheets

LOCK RELEASE MECHANISM

CROSS-REFERENCE TO RELATED APPLICATION

This application is based on and claims priority under 35 USC 119 from Japanese Patent Application No. 2016-092677 filed on May 2, 2016, the disclosure of which is incorporated by reference herein.

BACKGROUND

Technical Field

The present invention relates to a lock release mechanism.

Related Art

Japanese Patent Application Laid-Open (JP-A) No. 2012-116208 discloses a lock release mechanism that releases a locked state in which a seatback of a vehicle seat is locked (fixed) at a predetermined reclining angle.

In the lock release mechanism according to JP-A No. 2012-116208, an operation lever is provided at a shoulder of the seatback and can be tilted in the seat front-and-rear direction. When the operation lever is operated, a rod that couples the operation lever with a latch is operated, and a locked state of the latch with a striker disposed at the vehicle body is released.

For a lock release mechanism that includes an operation lever and a rod, a structure has been considered that suppresses looseness between the operation lever and the rod by urging one of the operation lever and the rod against the other with a spring or the like. In this structure, because it is necessary to add a component such as a spring or the like, the number of components is increased and costs are raised.

SUMMARY OF INVENTION

In consideration of the circumstances described above, an object of the present invention is to provide a lock release mechanism that may suppress looseness between an operation lever and a rod without the addition of a component.

The invention according to a first embodiment includes: an operation lever provided at a shoulder of a seatback of a vehicle seat, the operation lever being supported to be tiltable in a seat front-and-rear direction about an axis along a seat width direction; a rod that is elongated along a seat up-and-down direction, wherein the rod comprises: a coupled portion formed at an upper portion of the rod, the coupled portion being coupled to the operation lever to be tiltable about an axis along the seat width direction; a main body portion that is formed at the rod and extends toward a seat lower side from one side, in the seat width direction, of the coupled portion, the main body portion moving a lock member and releasing the lock member from a state of being locked to a vehicle body when the operation lever is operated to be tilted toward a seat front; and a projecting portion that is formed at the rod and projects toward the seat lower side at another side, in the seat width direction, of the coupled portion relative to the coupled portion and the main body portion; and a width direction limiting portion that is formed at the operation lever and is disposed between the main body portion and the projecting portion in the seat width direction, that abuts against at least one of the main body portion or the projecting portion, and that limits movement of the rod in the seat width direction relative to the operation lever.

According to the structure of the first embodiment of the present invention, the width direction limiting portion is formed at the operation lever and is disposed between the main body portion and the projecting portion in the seat width direction. The width direction limiting portion abuts against each of the main body portion and the projecting portion, and limits movement of the rod relative to the operation lever in the seat width direction.

Thus, because the width direction limiting portion limits movement of the rod relative to the operation lever in the seat width direction, looseness between the operation lever and the rod may be suppressed, in particular looseness in the seat width direction. Moreover, because the width direction limiting portion is formed at the operation lever, looseness between the operation lever and the rod may be suppressed without the addition of a component such as a spring or the like.

The invention according to a second embodiment further includes an up-and-down direction limiting portion that is formed at the operation lever, that abuts against the coupled portion from each of a seat upper side and a seat lower side thereof, and that limits movement of the rod in the seat up-and-down direction relative to the operation lever.

According to the structure of the second embodiment of the present invention, the up-and-down direction limiting portion formed at the operation lever abuts against the coupled portion from both the seat upper side and the seat lower side thereof, and limits movement of the rod relative to the operation lever in the seat up-and-down direction.

Thus, because the up-and-down direction limiting portion limits movement of the rod relative to the operation lever in the seat up-and-down direction, looseness between the operation lever and the rod may be suppressed, in particular looseness in the seat up-and-down direction. Moreover, because the up-and-down direction limiting portion is formed at the operation lever, looseness between the operation lever and the rod may be suppressed without the addition of a component such as a spring or the like.

In the invention according to a third embodiment, the width direction limiting portion includes a pair of abutting portions that are disposed between the main body portion and the projecting portion in the seat width direction, and that abut against each of the main body portion and the projecting portion, and the pair of abutting portions are deformable to bend in directions approaching one another in the seat width direction.

According to the structure of the third embodiment of the present invention, the pair of abutting portions that abut against, respectively, the main body portion and the projecting portion are deformable to bend in directions approaching one another in the seat width direction. Therefore, even if dimensional inconsistency of a spacing between the main body portion and the projecting portion causes, for example, a reduction in this dimension, the inconsistency may be absorbed by the pair of abutting portions bending.

In the invention according to a fourth embodiment, the pair of abutting portions are arranged with a spacing therebetween that is wider than a spacing between the main body portion and the projecting portion.

According to the structure of the fourth embodiment of the present invention, the pair of abutting portions are arranged with a spacing wider than the spacing between the main body portion and the projecting portion. Therefore, in the state in which the pair of abutting portions are deformed to bend, even if dimensional inconsistency of the spacing between the main body portion and the projecting portion causes, for example, the dimension to increase, the formation of gaps between the pair of abutting portions and, respectively, the main body portion and projecting portion may be suppressed.

In the invention according to a fifth embodiment, the coupled portion is curved in a circular arc shape, and the rod is inserted into a hole formed in the operation lever, starting from the projecting portion, to couple the coupled portion to the operation lever.

According to the structure of the fifth embodiment of the present invention, the rod is inserted from the projecting portion into the hole formed in the operation lever, to couple the rod to the operation lever at the coupled portion. Because the coupled portion is curved in the circular arc shape, work to insert and couple the rod in the hole formed in the operation lever is easier than in, for example, a structure in which the coupled portion is inflected at 90°.

With the structure described above, the present invention may suppress looseness between an operation lever and a rod without the addition of a component.

DETAILED DESCRIPTION

Figure 1:
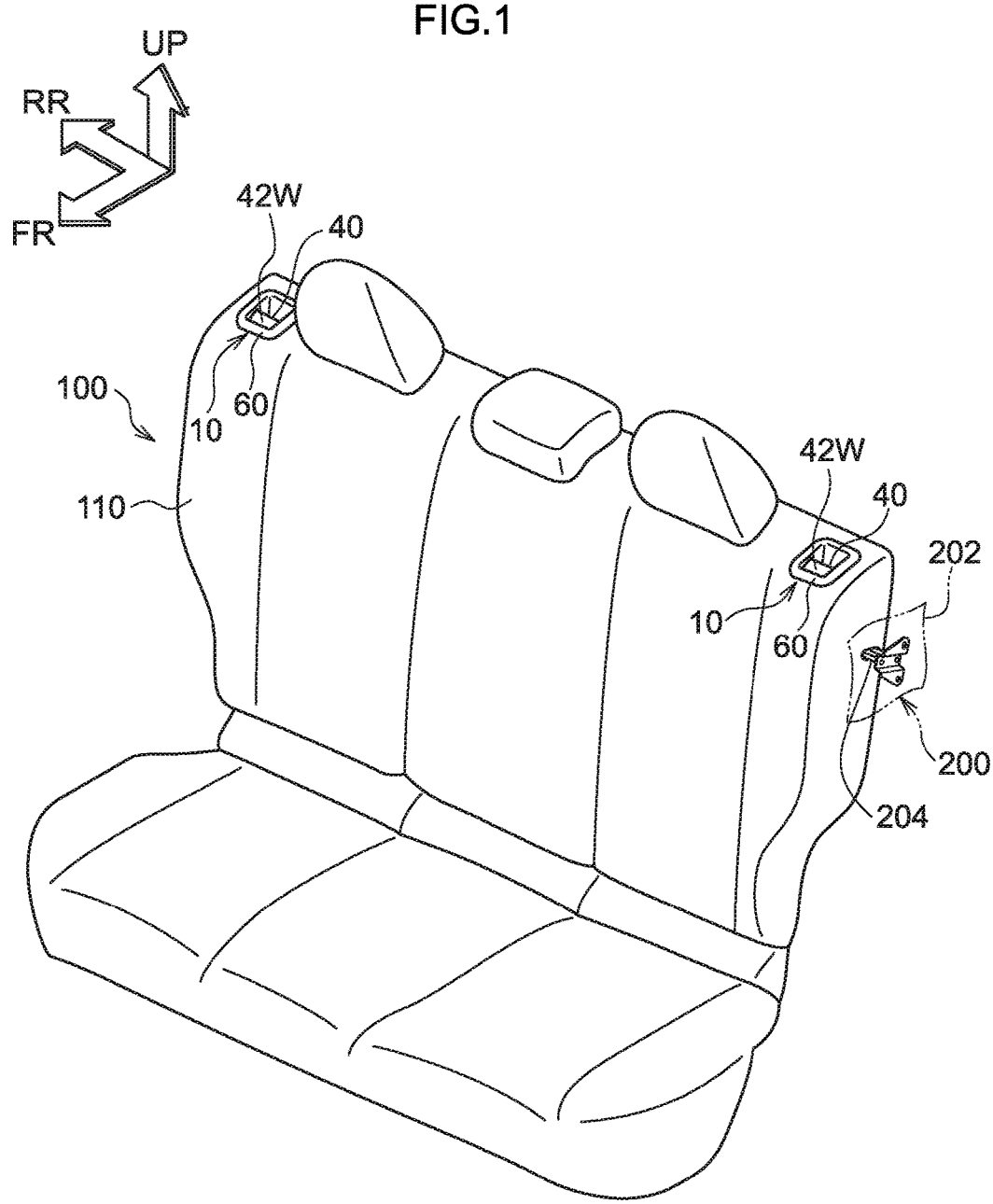
FIG. 1 is a perspective view showing structures of a rear seat at which a lock release mechanism according to a present exemplary embodiment is employed.

Herebelow, an example of an exemplary embodiment relating to the present invention is described in accordance with the drawings.

—Lock Release Mechanism 10—

A lock release mechanism 10 according to the present exemplary embodiment is described. The terms front, rear, up, down, left and right used in the descriptions below refer to the front and rear, up and down, and left and right of a vehicle seat in which the lock release mechanism 10 is employed. A seat width direction corresponds to the left-and-right direction of the vehicle seat. An arrow FR, an arrow UP and an arrow RR that are shown where appropriate in the drawings indicate, respectively, the seat front side, the seat upper side and the seat right side.

As shown in FIG. 1, the lock release mechanism 10 is provided at, for example, a seatback 110 of a rear seat 100 (an example of a vehicle seat), at each of shoulder regions at one end in the seat width direction (the left side) and the other end (the right side) of the seatback 110.

Lock plates 70 (examples of a lock member; see FIG. 3 and FIG. 5) are provided at portions at the one end and the other end in the seat width direction of the seatback 110. Strikers 204 are provided at side walls 202 of a vehicle body 200. Each lock release mechanism 10 is a structure that releases a state in which the lock plate 70 is locked to (engaged with) the striker 204.

The seatback 110 is retained at a predetermined reclining angle by the lock plates 70 being locked to the strikers 204. The seatback 110 may be, for example, tilted forward when the locking by the lock plates 70 is released by the lock release mechanisms 10.

The lock release mechanisms 10 disposed at the shoulder regions at the left side and right side of the seatback 110 have the same structures, except for being symmetrical between left and right. Herebelow, the lock release mechanism 10 that is disposed at the shoulder region at the left side of the seatback 110 is described.

Figure 2:
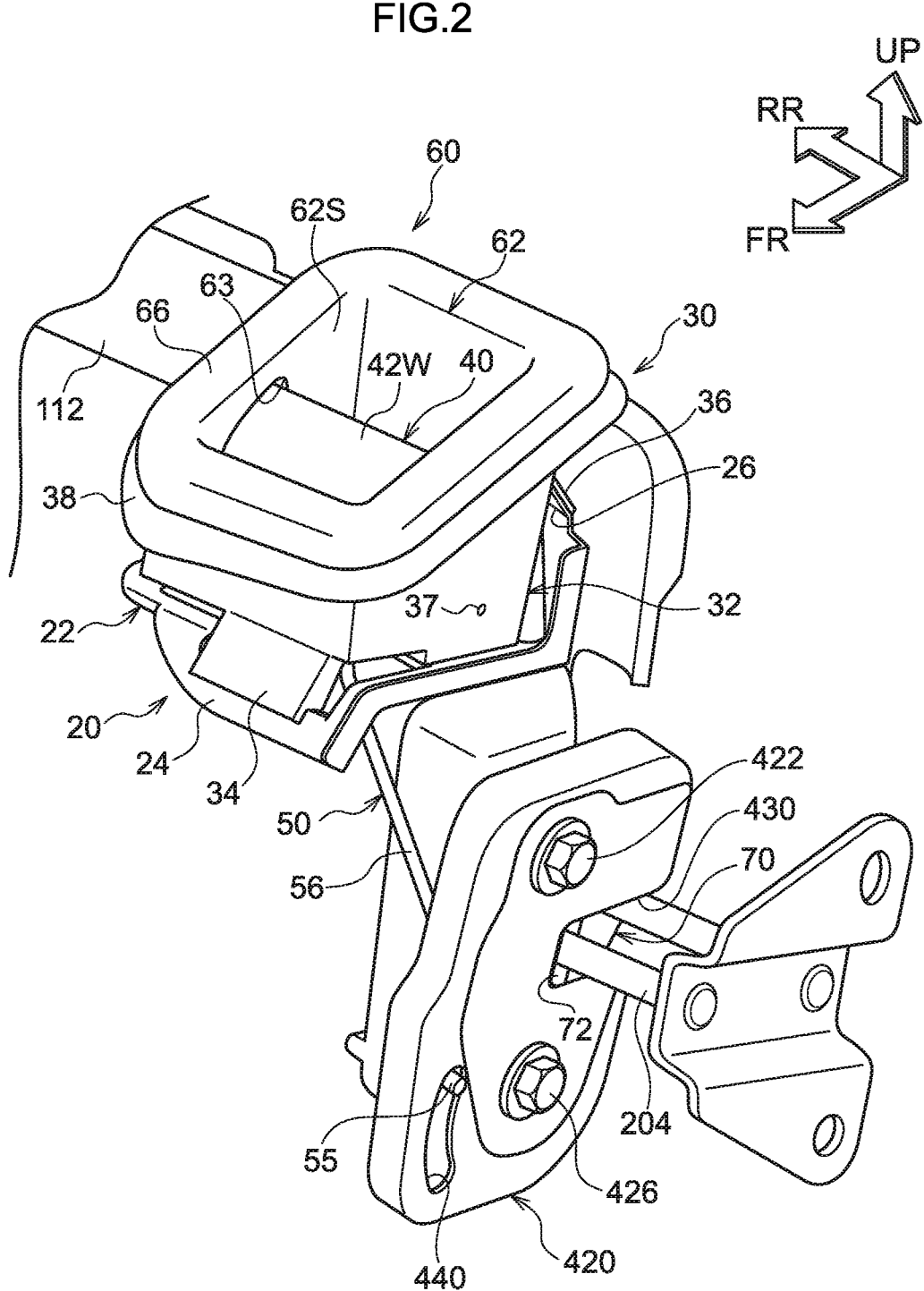
FIG. 2 is a perspective view showing structures of the lock release mechanism according to the present exemplary embodiment.
Figure 3:
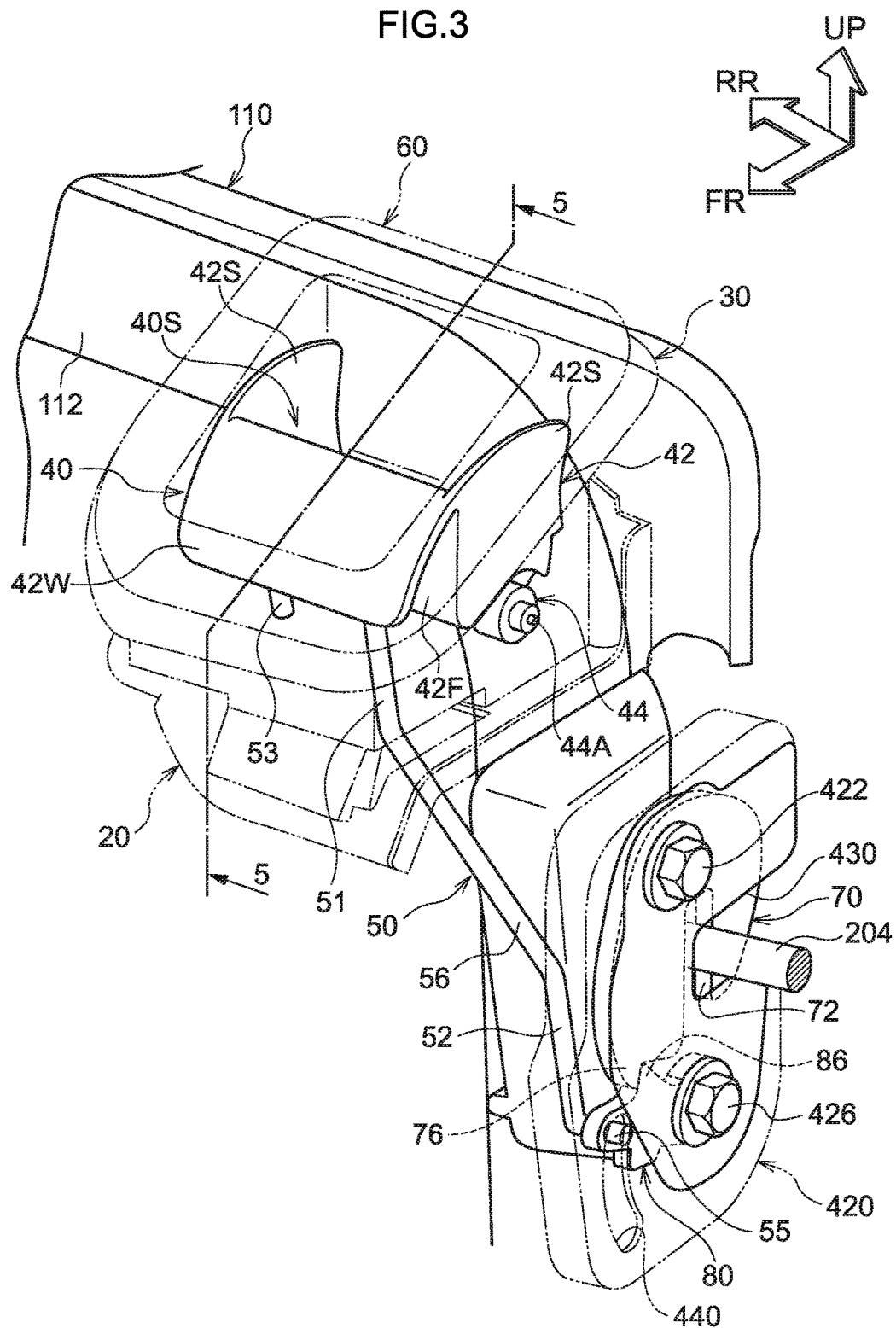
FIG. 3 is a perspective view of structures of the lock release mechanism shown in FIG. 2, in which internal structural members are visibly shown.
Figure 4:
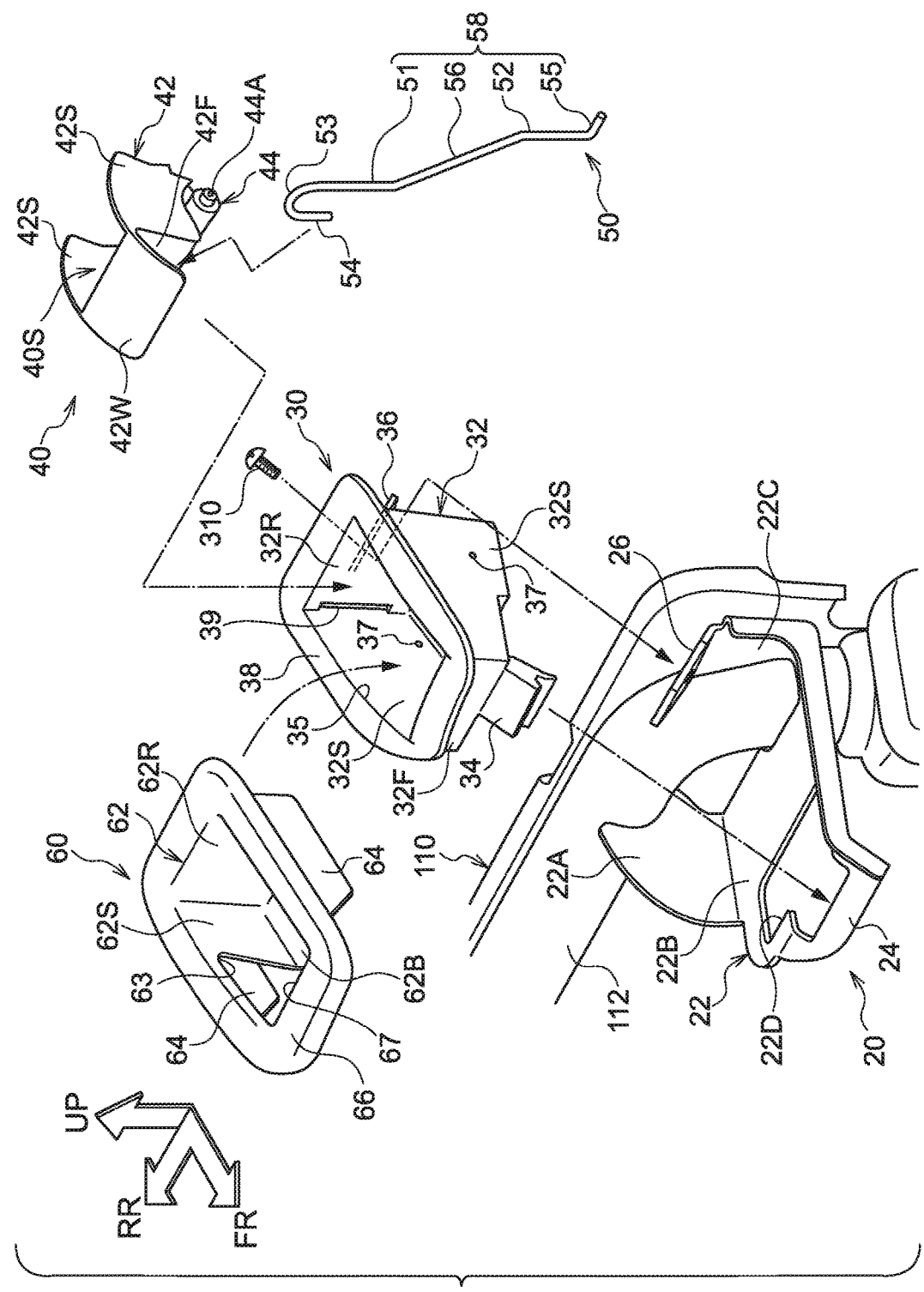
FIG. 4 is an exploded perspective view showing structures of the lock release mechanism according to the present exemplary embodiment.

To be specific, as shown in FIG. 2, FIG. 3 and FIG. 4, the lock release mechanism 10 includes a bracket 20, a case 30, an operation lever 40, a rod 50, a cover 60 and an engaging plate 80 (see FIG. 3).

—The Lock Plate 70—

Figure 5:
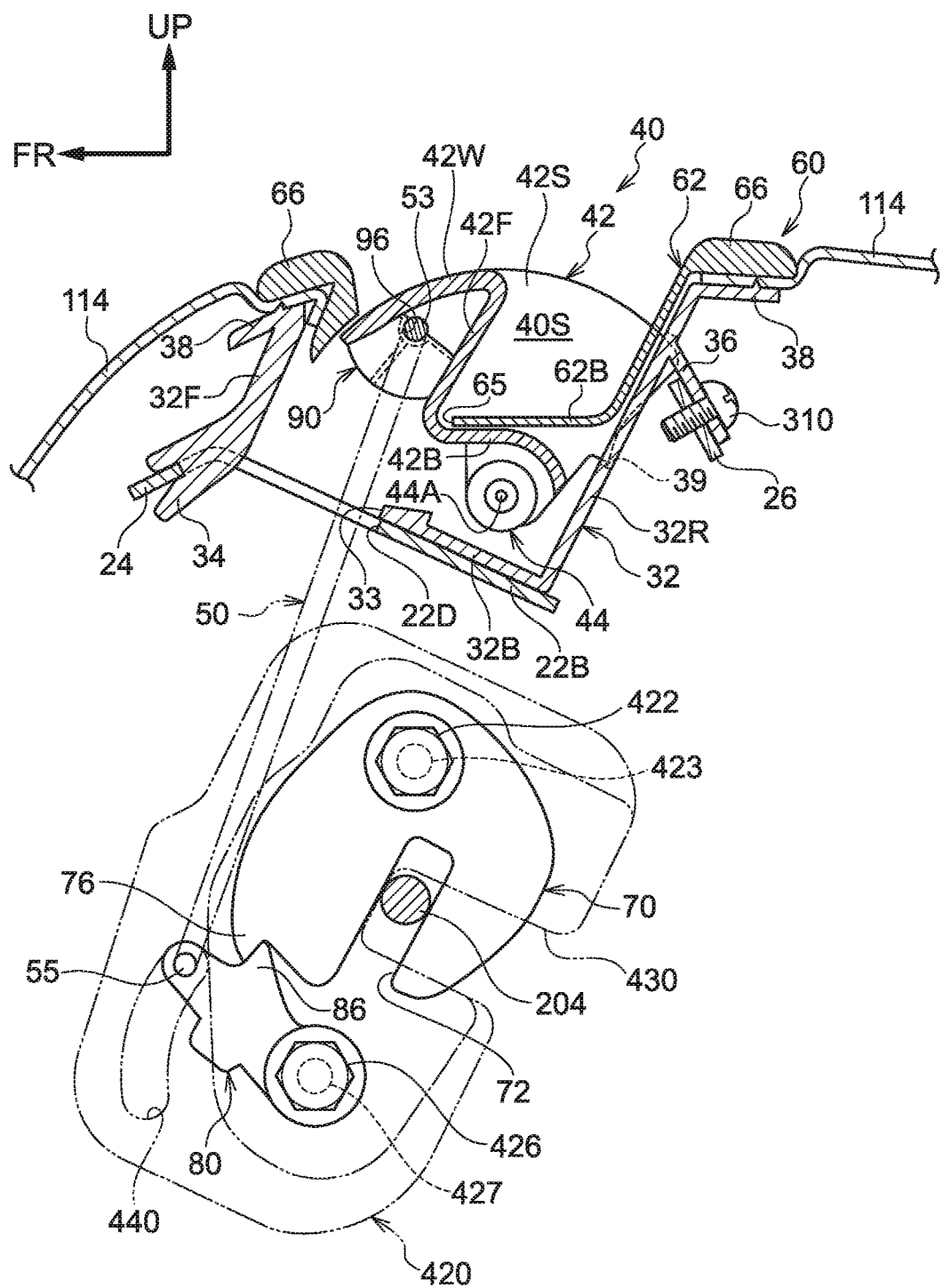
FIG. 5 is a side sectional view (a sectional view cut along line 5-5 in FIG. 3) of the lock release mechanism according to the present exemplary embodiment.

The lock plate 70, whose locked state is to be released by the lock release mechanism 10, is formed in a plate shape with thickness in the seat width direction (see FIG. 3). As shown in FIG. 3 and FIG. 5, a notch 72 (an engaging recess portion) for locking to (engaging with) the striker 204 is formed in the lock plate 70. The notch 72 opens to the lower side. Thus, due to the notch 72 being formed, the lock plate 70 is formed in an inverted "U" shape as seen in side view (as seen in the seat width direction).

The lock plate 70 is tiltably supported at a side portion of a frame 112 of the seatback 110 by, for example, a shaft portion 423 of a bolt 422, which is described below. To be specific, the lock plate 70 is supported to be tiltable between a locked position (the position shown in FIG. 5), at which the lock plate 70 is locked to the striker 204, and a lock release position (the position shown in FIG. 6), at which the locking to the striker 204 is released. The lock plate 70 is urged toward the lock release position by an urging member such as a spring or the like (not shown in the drawings).

An engaged portion 76 is formed at a front side portion of a lower end portion of the lock plate 70. The engaged portion 76 is engaged with an engaging portion 86 of the engaging plate 80. As shown in FIG. 5, when the engaged portion 76 is engaged with the engaging portion 86 of the engaging plate 80 at the locked position, the lock plate 70 resists the urging member urging the lock plate 70 toward the lock release position and stays at the locked position. Thus, the locked state with the striker 204 is maintained.

—The Engaging Plate 80—

The engaging plate 80 is formed in a plate shape with thickness in the seat width direction (see FIG. 3). As shown in FIG. 3 and FIG. 5, the engaging portion 86 that engages with the engaged portion 76 of the lock plate 70 is formed at an upper portion of the engaging plate 80. The engaging portion 86 is formed in an upward protruding shape.

A rear portion of the engaging plate 80 is tiltably supported at the side portion of the frame 112 of the seatback 110 by, for example, a shaft portion 427 of a bolt 426, which is described below. To be specific, the engaging plate 80 is supported to be tiltable between an engaging position (the position shown in FIG. 5), at which the engaging portion 86 may engage with the engaged portion 76 of the lock plate 70, and a disengaged position (the position shown in FIG. 6), at which the engaging plate 80 does not engage with the engaged portion 76 of the lock plate 70. The engaging plate 80 is urged toward the engaging position by an urging member such as a spring or the like (not shown in the drawings). A lower portion of the rod 50 (an attached portion 55, which is described below) is tiltably attached to a front portion of the engaging plate 80.

The engaging plate 80 and the lock plate 70 are covered from the left side thereof by a side cover 420, which is bolt-fastened to the side portion of the frame 112 of the seatback 110 by the bolts 422 and 426, which are disposed at the upper and lower sides of the side cover 420. A notch 430 is formed in a rear side portion of a height direction central portion of the side cover 420. The striker 204 can be inserted into the notch 430.

—The Bracket 20—

The bracket 20 is structured by, for example, a metal plate. As shown in FIG. 4, the bracket 20 includes a bracket main body 22, a sandwiched portion 24 (an attachment-receiving portion) and a fixed piece 26 (an attachment-receiving portion). The bracket main body 22 is fixed to the frame 112 of the seatback 110 in the shoulder region of the seatback 110. The sandwiched portion 24 and the fixed piece 26 are provided at the bracket main body 22.

The bracket main body 22 includes a bottom wall 22B and plural fixing portions 22A and 22C. The fixing portions 22A and 22C stand from the bottom wall 22B and are fixed to the frame 112. An opening 22D (see FIG. 6) is formed in a front portion of the bottom wall 22B. The opening 22D assures space for movement of the operation lever 40, which moves from a first position thereof (the position shown in FIG. 5) to a second position (the position shown in FIG. 6), as described below.

In specific terms, the sandwiched portion 24 is integrally provided at the front portion of the bottom wall 22B of the bracket main body 22 and is formed in a plate shape that is elongated in the left-and-right direction.

In specific terms, the fixed piece 26 is integrally provided at an upper portion of the fixing portion 22C of the bracket main body 22 and is structured by a plate piece that faces diagonally rearward and upward. The fixed piece 26 is disposed diagonally upward and rearward of the sandwiched portion 24.

—The Case 30—

As shown in FIG. 4, the case 30 includes a case main body 32, a sandwiching portion 34 and a fixing piece 36. The case main body 32 is formed in a box shape that opens upward. The sandwiching portion 34 is provided at the case main body 32 and sandwiches the sandwiched portion 24. The fixing piece 36 is provided at the case main body 32 and is fixed to the fixed piece 26.

Side walls 32S at the left and right of the case main body 32 steadily decrease in height from the rear side toward the front side. An upper portion opening 35 is formed in the case main body 32 and faces diagonally forward and upward. A flange 38 is formed at peripheral edges of the upper portion opening 35.

Support holes 37 are formed in the left and right side walls 32S of the case main body 32. The support holes 37 serve as support portions that support the operation lever 40. An opening 33 (see FIG. 6) is formed in a front region of a floor wall 32B of the case main body 32. The opening 33 assures space for the movement of the operation lever 40 moving from the first position thereof (the position shown in FIG. 5) to the second position (the position shown in FIG. 6). The opening 33 is disposed to be superposed from above with the opening 22D of the bracket 20.

Slits 39 are formed in the right end and left end of a rear wall 32R of the case main body 32. The slits 39 are for preventing interference with portions of the operation lever 40 (to be specific, a pair of side walls 42S, which are described below) when the operation lever 40 is disposed at the first position (the position shown in FIG. 5).

The sandwiching portion 34 is provided at an outer face of a front wall 32F of the case main body 32 so as to protrude diagonally forward and downward from the front wall 32F. A distal end portion (front end portion) of the sandwiching portion 34 is formed in an upper and lower bifurcated shape. The distal end portion of the sandwiching portion 34 sandwiches the sandwiched portion 24 of the bracket 20 from above and below. Thus, the front portion of the case main body 32 is attached (fixed) to the bracket 20.

The fixing piece 36 is provided at an outer face of the rear wall 32R of the case main body 32 so as to protrude diagonally rearward and downward from the rear wall 32R. In a state in which the fixing piece 36 is superposed with an upper face of the fixed piece 26 of the bracket 20, the fixing piece 36 is fixed to the fixed piece 26 by a screw 310. Thus, the rear portion of the case main body 32 is attached to the bracket 20.

—The Operation Lever 40—

Figure 7:
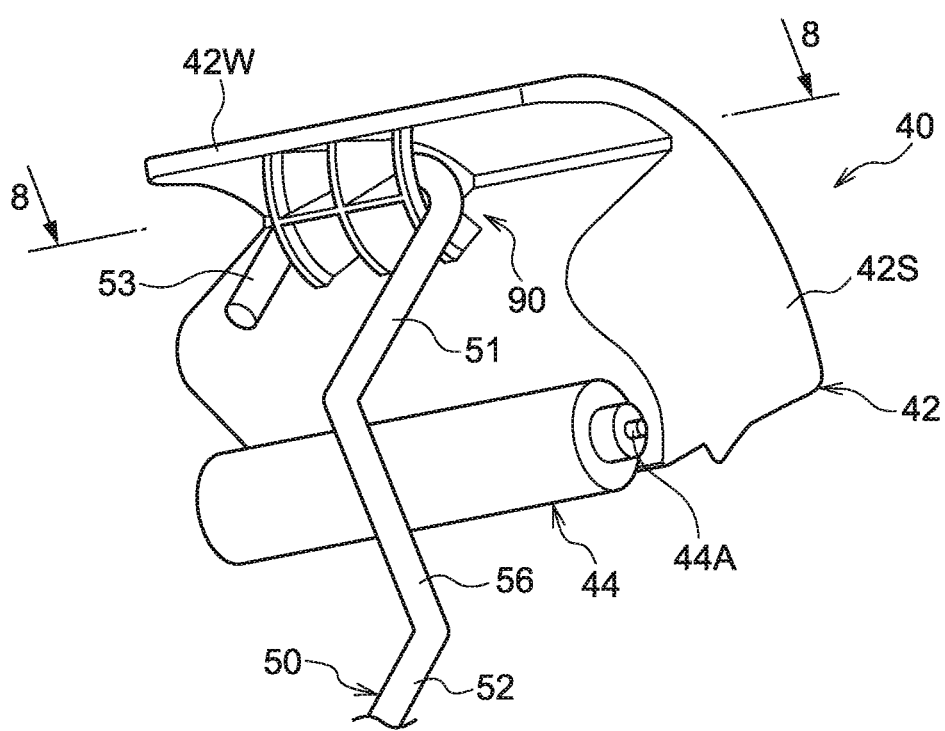
FIG. 7 is a perspective view in which structures of an operation lever according to the present exemplary embodiment are viewed from a lower side.

As shown in FIG. 7, the operation lever 40 includes a lever main body 42, a supported portion 44 and a coupling portion 90. As shown in FIG. 4 and FIG. 5, the lever main body 42 includes a pair of side walls 42S, a front wall 42F, a bottom wall 42B (see FIG. 5) and a curved portion 42W.

The pair of side walls 42S are disposed with a gap therebetween into which a finger of an operator can be inserted. That is, an insertion space 40S into which a finger of an operator can be inserted is formed between the pair of side walls 42S.

Front ends of the pair of side walls 42S are connected with one another by the front wall 42F and bottom ends of the same are connected with one another by the bottom wall 42B. The insertion space 40S between the pair of side walls 42S opens upward and rearward of the operation lever 40 itself. In a state in which the operation lever 40 and the cover 60 have been assembled to the case 30 (see FIG. 2 and FIG. 5), the rear side of the insertion space 40S is closed off by a rear wall 62R of the cover 60. Therefore, in this assembled state, a finger of an operator is to be inserted into the insertion space 40S from above.

The supported portion 44 is provided at a lower face side of the bottom wall 42B. That is, the supported portion 44 constitutes a lower portion of the operation lever 40. As shown in FIG. 4, the supported portion 44 includes shaft portions 44A that protrude in each of the left and right directions. The shaft portions 44A are inserted into the support holes 37 of the case main body 32. Thus, the operation lever 40 is supported at the case 30 to be tiltable in the front-and-rear direction about an axis along the seat width direction. That is, the lever main body 42 of the operation lever 40 is made tiltable in the front-and-rear direction, pivoting about the supported portion 44 (the lower portion of the operation lever 40). To be specific, the operation lever 40 is made tiltable between the first position (the position shown in FIG. 5) and the second position (the position shown in FIG. 6).

The operation lever 40 is urged toward the first position by the aforementioned urging member (not shown in the drawings) urging the engaging plate 80 toward the engaging position thereof. The operation lever 40 can be operated to tilt forward toward the second position by a finger inserted into the insertion space 40S pushing the front wall 42F forward. Thus, the front wall 42F of the operation lever 40 functions as an operation surface that is operated to tilt the operation lever 40 forward about the axis along the seat width direction.

As shown in FIG. 5, the curved portion 42W of the lever main body 42 protrudes to the front from the upper end of the front wall 42F. The curved portion 42W is curved in a circular arc shape along the direction of tilting about the shaft portions 44A.

The coupling portion 90 is a portion to which the rod 50 is coupled. The coupling portion 90 is disposed between the curved portion 42W and the front wall 42F. A coupling hole 96 through which the rod 50 can be inserted is formed in the coupling portion 90, in the seat width direction. Specific structures of the coupling portion 90 are described below.

—The Rod 50—

As shown in FIG. 4, the rod 50 is elongated in the up-and-down direction. To be specific, the rod 50 includes a coupled portion 53, a projecting portion 54 and a main body portion 58.

The coupled portion 53 is formed at an upper portion of the rod 50. Seen in a rear view, the coupled portion 53 is curved in a circular arc shape. The coupled portion 53 is coupled to the coupling portion 90 of the operation lever 40 to be tiltable about an axis along the seat width direction.

The main body portion 58 is formed at a portion of the rod 50 at the lower side of the coupled portion 53. The main body portion 58 extends to the seat lower side from the left side (one side in the seat width direction) of the coupled portion 53. To be specific, the main body portion 58 includes a first straight portion 51, a second straight portion 52, an inclined portion 56 and the attached portion 55.

The first straight portion 51 is formed in a linear shape that extends in the up-and-down direction. The second straight portion 52 is formed in a linear shape that extends in the up-and-down direction, at a position that is offset to the lower side and the left side relative to the first straight portion 51. An upper end of the inclined portion 56 is connected to a lower end of the first straight portion 51; a lower end of the inclined portion 56 is connected to an upper end of the second straight portion 52. As seen in rear view, the inclined portion 56 is inclined diagonally rightward and upward from the upper end of the second straight portion 52 to the lower end of the first straight portion 51.

The attached portion 55 extends leftward from a lower end of the second straight portion 52 and is tiltably attached to the front portion of the engaging plate 80. The attached portion 55 is guided by a long hole 440 in a circular arc shape that is formed in the side cover 420, as shown in FIG. 2.

The projecting portion 54 is formed in a linear shape that extends in the up-and-down direction at a location that is at the right side relative to the first straight portion 51. The coupled portion 53 is formed in the circular arc shape, linking an upper end of the first straight portion 51 with an upper end of the projecting portion 54.

Figure 6:
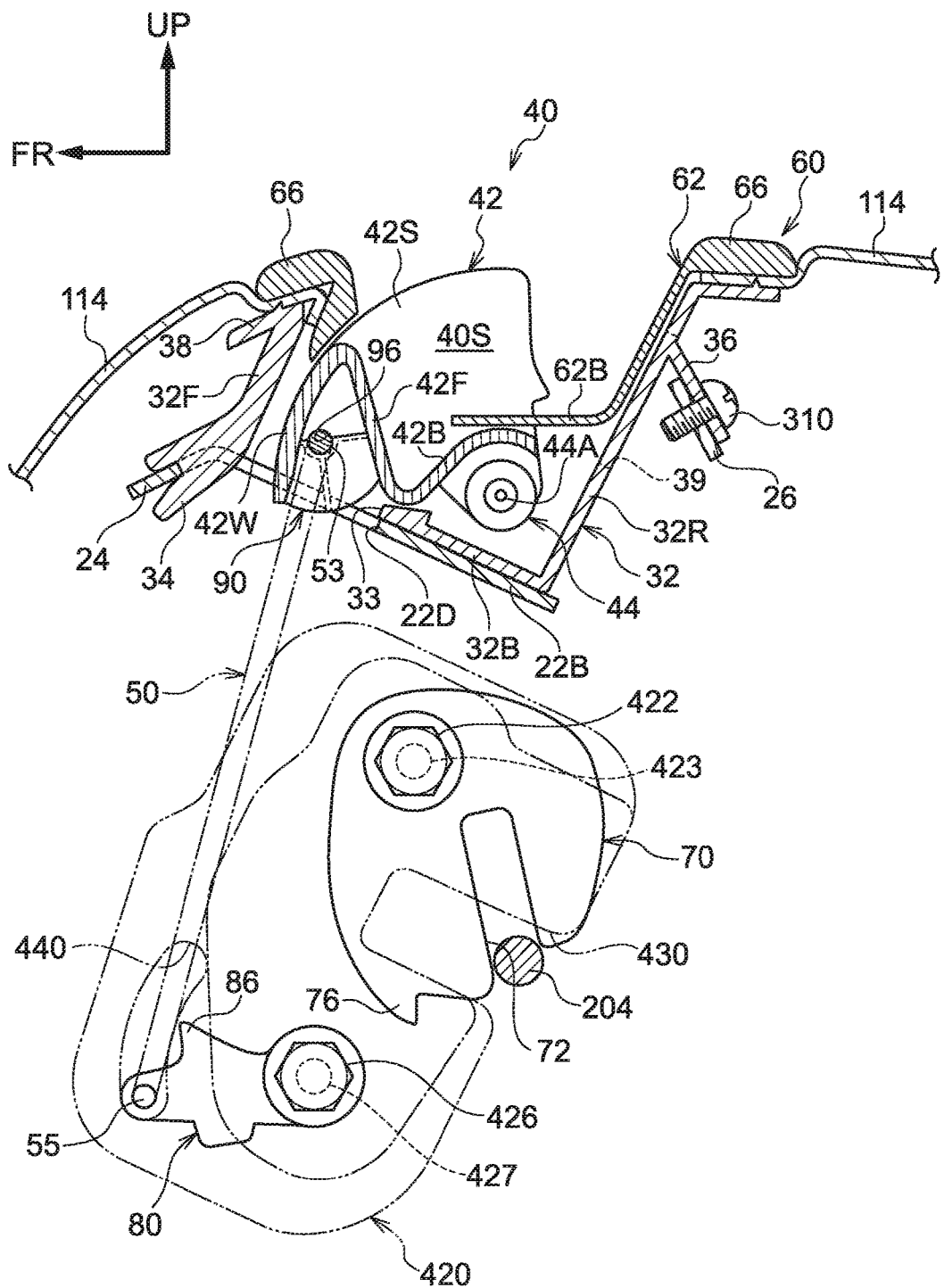
FIG. 6 is a side sectional view of structures of the lock release mechanism shown in FIG. 5, showing a state in which locking of a lock plate is released.

When the operation lever 40 is operated to be tilted forward, the rod 50 moves downward and the attached portion 55 of the main body portion 58 moves the engaging plate 80, releasing the locked state of the lock plate 70 (see FIG. 6). The lock release operation is more specifically described below.

—The Cover 60—

The cover 60 is attached to the case 30 so as to cover portions (the pair of side walls 42S and the bottom wall 42B) of the operation lever 40 that is accommodated in the case 30. In the state in which the cover 60 is attached to the case 30, the curved portion 42W and front wall 42F of the operation lever 40 are in an exposed state (see FIG. 2 and FIG. 5).

To be specific, as shown in FIG. 4, the cover 60 includes a cover main body 62, a flange 66 and a pair of side plates 64. The cover main body 62 is formed in a box shape that opens upward and forward.

Openings 63 (cutaways) and an opening 65 (a cutaway; see FIG. 5) are formed in front portions of the side walls 62S of the cover main body 62 and a front portion of a bottom wall 62B of the cover main body 62. The openings 63 and opening 65 assure space for the operation lever 40 to be disposed in.

The flange 66 is formed at peripheral edges of an upper portion opening 67 of the cover main body 62. The flange 66 is formed in a frame shape as seen in plan view. As shown in FIG. 5, the flange 66 and the flange 38 of the case 30 sandwiches a skin 114 of the seatback 110.

The pair of side plates 64 are disposed at outer sides in the seat width direction relative to the side walls 62S of the cover main body 62, with respective gaps between the side plates 64 and the side walls 62S. These gaps serve as disposition spaces in which the pair of side walls 42S of the operation lever 40 are disposed.

—The Coupling Portion 90 of the Operation Lever 40—

Figure 8:
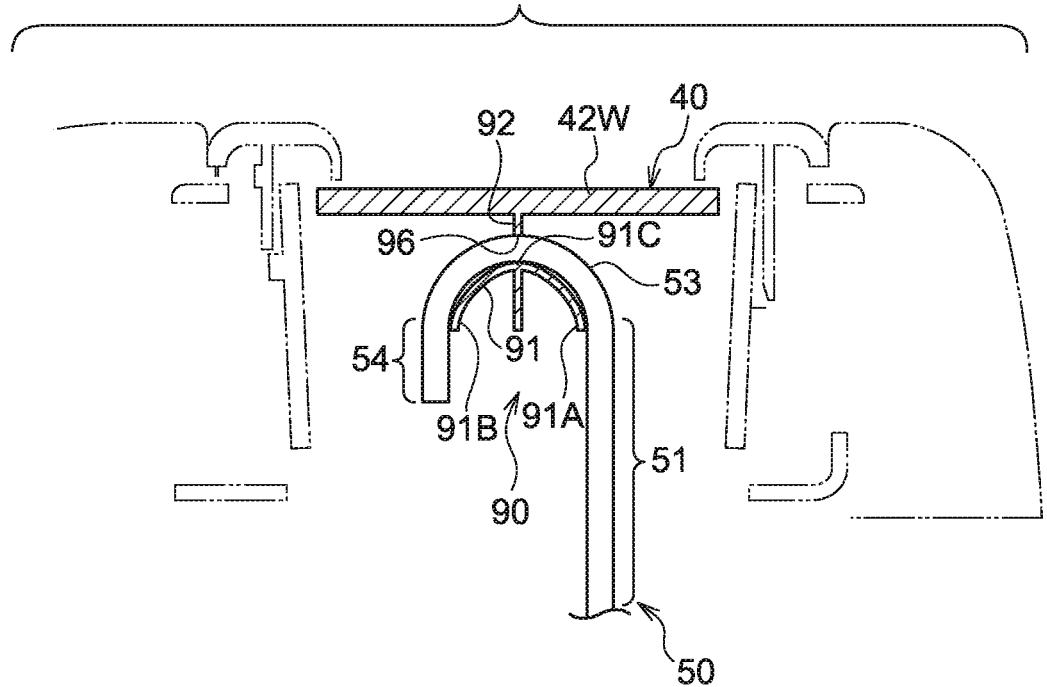
FIG. 8 is a front sectional view (a sectional view cut along line 8-8 in FIG. 7) showing structures of a coupling portion of the operation lever according to the present exemplary embodiment.
Figure 9:
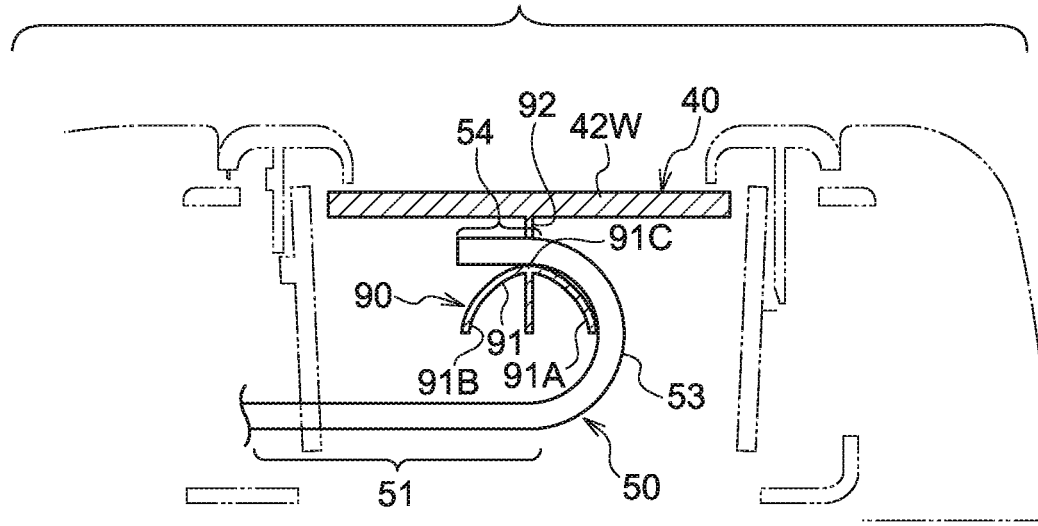
FIG. 9 is a front sectional view of the structures shown in FIG. 8, showing a state in which a projecting portion of a rod is inserted into a coupling hole of the operation lever.
Figure 10:
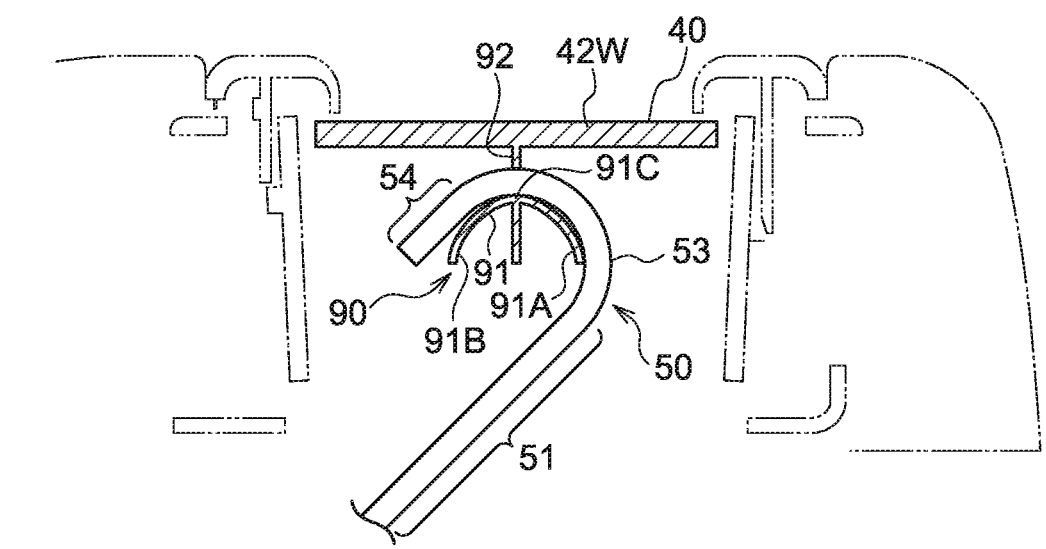
FIG. 10 is a front sectional view showing a state in which the rod has been turned from the state shown in FIG. 9.

The coupling portion 90 is a portion to which the rod 50 is coupled. The coupling portion 90 is coupled to the coupled portion 53 of the rod 50. As shown in FIG. 5 and FIG. 8, the coupling hole 96 is formed in the coupling portion 90. The coupling hole 96 is open to both sides in the seat width direction. The rod 50 and the operation lever 40 are coupled by the coupled portion 53 of the rod 50 being inserted, starting from the projecting portion 54, into the coupling hole 96. To be specific, as shown in FIG. 9, the projecting portion 54 formed at one end portion of the rod 50 is inserted into the coupling hole 96 in the seat width direction. Hence, as shown in FIG. 10, the rod 50 is turned substantially through 90°. Thus, the coupled portion 53 is coupled to the coupling portion 90 of the operation lever 40 to be tiltable about an axis along the seat width direction. A first abutting rib 91, which is described below, functions as a guide when the rod 50 is being inserted into the coupling hole 96. The first abutting rib 91 is formed in an inverted "U" shape as seen in a front sectional view.

As shown in FIG. 8, the coupling portion 90 includes the first abutting rib 91 and a second abutting rib 92. The first abutting rib 91 limits movement of the rod 50 in the seat width direction and movement of the rod 50 downward relative to the operation lever 40. The second abutting rib 92 limits movement of the rod 50 upward relative to the operation lever 40.

In the state in which the rod 50 and the operation lever 40 are coupled, the first abutting rib 91 is disposed at an inner side (the inner periphery side of the coupled portion 53), being surrounded by the first straight portion 51, the projecting portion 54 and the coupled portion 53.

The first abutting rib 91 includes abutting portions 91A and 91B that abut against respective opposing portions (opposing faces) of the first straight portion 51 and projecting portion 54 that oppose one another. To be specific, the abutting portions 91A and 91B are disposed between the first straight portion 51 and the projecting portion 54 in the seat width direction, and the abutting portions 91A and 91B abut in the left-and-right direction against, respectively, an upper end of the opposing portion of the first straight portion 51 and an upper end of the opposing portion of the projecting portion 54.

Because the abutting portions 91A and 91B abut against, respectively, the first straight portion 51 and the projecting portion 54 in this manner, the abutting portions 91A and 91B limit movement of the rod 50 in the seat width direction relative to the operation lever 40. That is, the abutting portions 91A and 91B function as a width direction limiting portion that limits movement of the rod 50 relative to the operation lever 40 in the seat width direction.

The abutting portions 91A and 91B are deformable to bend in directions approaching one another in the seat width direction. The abutting portions 91A and 91B are arranged with a wider spacing than a spacing between the first straight portion 51 and the projecting portion 54.

The first abutting rib 91 also includes an abutting portion 91C that abuts against an inner periphery portion (inner periphery face) of the coupled portion 53. Thus, movement of the rod 50 downward relative to the operation lever 40 is limited by the abutting portion 91C abutting against the inner periphery portion (inner periphery face) of the coupled portion 53.

As described above, the first abutting rib 91 abuts against the rod 50 at three locations: the abutting portions 91A, 91B and 91C. Gaps between the first abutting rib 91 and the rod 50 are formed between the abutting portion 91A and the abutting portion 91C and between the abutting portion 91B and the abutting portion 91C.

The second abutting rib 92 extends downward from the curved portion 42W and abuts against an outer periphery portion (outer periphery face) of the coupled portion 53. Thus, movement of the rod 50 upward relative to the operation lever 40 is limited by the second abutting rib 92 abutting against the outer periphery portion (outer periphery face) of the coupled portion 53. In the present exemplary embodiment, the coupled portion 53 of the rod 50 is sandwiched from above and below by the second abutting rib 92 and the abutting portion 91C of the first abutting rib 91. Thus, the second abutting rib 92 and the abutting portion 91C of the first abutting rib 91 function as an up-and-down direction limiting portion that limits movement of the rod 50 in the up-and-down direction relative to the operation lever 40.

—Locking Operation and Lock Release Operation of the Lock Plate 70—

Now, the locking operation and lock release operation of the lock plate 70 according to the present exemplary embodiment are described.

The locking operation of the lock plate 70 is carried out, for example, as follows.

Before the locking operation is begun, the locked state of the lock plate 70 has been released and, for example, the seatback 110 has been leaned forward. In this state, because the lock plate 70 is urged toward the lock release position (the position shown in FIG. 6) by the urging member thereof (not shown in the drawings), the lock plate 70 is disposed at the lock release position. Meanwhile, because the engaging plate 80 is urged toward the engaging position (the position shown in FIG. 5) by the urging member thereof (not shown in the drawings), the engaging plate 80 and the operation lever 40 are disposed at, respectively, the engaging position (the position of the engaging plate 80 shown in FIG. 5) and the first position (the position of the operation lever 40 shown in FIG. 5).

In the locking operation of the present exemplary embodiment, an operator, for example, leans the seatback 110 that has been leaned forward toward the vehicle rear, lifting the seatback 110. Correspondingly, each striker 204 enters into the notch 72 of the respective lock plate 70 (see FIG. 6). The striker 204 pushes the lock plate 70 and moves the lock plate 70 toward the locked position (the position shown in FIG. 5). At this time, the engaged portion 76 of the lock plate 70 rides over the engaging portion 86 of the engaging plate 80 and is engaged with the engaging portion 86 (see FIG. 5). Thus, the lock plates 70 are locked to the strikers 204 and the seatback 110 is retained at the predetermined reclining angle.

The lock release operation of the lock plate 70 is carried out, for example, as follows.

In the lock release operation according to the present exemplary embodiment, for example, an operator performs the operation to tilt the operation lever 40 forward by pushing the front wall 42F of the operation lever 40 forward. When the operation lever 40 is operated to tilt forward, the operation lever 40 is tilted toward the second position (the position shown in FIG. 6) and the rod 50 moves downward.

When the rod 50 moves downward, the engaging plate 80 moves toward the disengaged position (the position shown in FIG. 6), and the engagement of the engaging portion 86 of the engaging plate 80 with the engaged portion 76 of the lock plate 70 is released. When the engagement of the engaging portion 86 with the engaged portion 76 is released, the lock plate 70 is moved towards the lock release position by the urging force of the urging member (not shown in the drawings). Thus, the locking of each lock plate 70 to the striker 204 is released and the seatback 110 can be leaned forward.

—Operational Effects of the Present Exemplary Embodiment—

Now, operational effects of the present exemplary embodiment are described.

According to the structure of the present exemplary embodiment, as shown in FIG. 8, the abutting portions 91A and 91B formed at the operation lever 40 abut in the left-and-right direction against, respectively, the upper end of the opposing portion of the first straight portion 51 and the upper end of the opposing portion of the projecting portion 54. Thus, the abutting portions 91A and 91B limit movement of the rod 50 in the seat width direction relative to the operation lever 40.

Thus, because the abutting portions 91A and 91B limit movement of the rod 50 in the seat width direction relative to the operation lever 40, looseness between the operation lever 40 and the rod 50 may be suppressed, in particular looseness in the seat width direction. Moreover, because the abutting portions 91A and 91B are formed at the operation lever 40, looseness between the operation lever 40 and the rod 50 may be suppressed without the addition of a component such as a spring or the like.

In the present exemplary embodiment, the second abutting rib 92 and the abutting portion 91C of the first abutting rib 91 formed at the operation lever 40 abut against the coupled portion 53 of the rod 50 from, respectively, above and below. Thus, the second abutting rib 92 and abutting portion 91C limit movement of the rod 50 in the up-and-down direction relative to the operation lever 40.

Thus, because the second abutting rib 92 and the abutting portion 91C of the first abutting rib 91 limit movement of the rod 50 in the up-and-down direction relative to the operation lever 40, looseness between the operation lever 40 and the rod 50 may be suppressed, in particular looseness in the up-and-down direction. Moreover, because the second abutting rib 92 and the abutting portion 91C of the first abutting rib 91 are formed at the operation lever 40, looseness between the operation lever 40 and the rod 50 may be suppressed without the addition of a component such as a spring or the like.

In the present exemplary embodiment, the abutting portions 91A and 91B abutting against, respectively, the first straight portion 51 and the projecting portion 54 are deformable to bend in directions approaching one another in the seat width direction. Therefore, even if dimensional inconsistency of the spacing between the first straight portion 51 and the projecting portion 54 causes, for example, a reduction in this dimension, the inconsistency may be absorbed by the abutting portions 91A and 91B bending.

In the present exemplary embodiment, because the abutting portions 91A and 91B are arranged with a spacing wider than the spacing between the first straight portion 51 and the projecting portion 54, even if dimensional inconsistency of the spacing between the first straight portion 51 and the projecting portion 54 causes, for example, an increase in this dimension, the formation of gaps between the abutting portions 91A and 91B and, respectively, the first straight portion 51 and the projecting portion 54 may be suppressed.

In the present exemplary embodiment, the rod 50 is inserted into the coupling hole 96 formed in the operation lever 40 starting from the projecting portion 54 of the rod 50, and the rod 50 and operation lever 40 are coupled at the coupled portion 53. Because the coupled portion 53 is curved in a circular arc shape, work to insert and couple the rod 50 in the coupling hole 96 is easier than in, for example, a structure in which the coupled portion 53 is inflected at 90°.

—Variant Examples—

In the exemplary embodiment described above, the lower portion of the rod 50 (the attached portion 55) is attached to the engaging plate 80, and the lock plate 70 is operated (moved) via the engaging plate 80, but this is not limiting. For example, the lower portion of the rod 50 may be attached to the lock plate 70 and may operate (move) the lock plate 70 directly. Alternatively, the rod 50 may operate (move) the lock plate 70 via plural members. That is, in the present exemplary embodiment it is sufficient if, when the operation lever 40 is operated to be tilted forward, a lock member such as the lock plate 70 or the like is moved via the rod 50 and the locked state of the lock member is released.

In the exemplary embodiment described above, movement of the rod 50 relative to the operation lever 40 in the seat width direction and in the seat up-and-down direction is limited, but this is not limiting. It is sufficient if movement of the rod 50 relative to the operation lever 40 in at least the seat width direction is limited.

In the exemplary embodiment described above, the abutting portions 91A and 91B are arranged with a spacing wider than the spacing between the first straight portion 51 and the projecting portion 54, and the abutting portions 91A and 91B abut against the first straight portion 51 and the projecting portion 54 in a state in which the abutting portions 91A and 91B are deformed in directions approaching one another, but this is not limiting. For example, the abutting portions 91A and 91B may be arranged with a spacing the same as the spacing between the first straight portion 51 and the projecting portion 54. Further, the abutting portions 91A and 91B may be arranged with a spacing slightly smaller than the spacing between the first straight portion 51 and the projecting portion 54. In this case, one of the abutting portions 91A and 91B abuts against one of the first straight portion 51 and the projecting portion 54 to limit movement of the rod 50 in the seat width direction relative to the operation lever 40.

The present invention is not limited by the exemplary embodiment described above; numerous modifications, alterations and improvements are possible. For example, structures are possible in which the variant examples illustrated above are plurally combined as appropriate.

What is claimed is:

1. A lock release mechanism comprising:
   an operation lever provided at a shoulder of a seatback of a vehicle seat, the operation lever being supported to be tiltable in a seat front-and-rear direction about an axis along a seat width direction;
   a rod that is elongated along a seat up-and-down direction, wherein the rod comprises:
      a coupled portion formed at an upper portion of the rod, the coupled portion being coupled to the operation lever to be tiltable about an axis along the seat width direction;
      a main body portion that is formed at the rod and extends toward a seat lower side from one side, in the seat width direction, of the coupled portion, the main body portion moving a lock member and releasing the lock member from a state of being locked to a vehicle body when the operation lever is operated to be tilted toward a seat front;
      a projecting portion that is formed at the rod and projects toward the seat lower side at another side, in the seat width direction, of the coupled portion relative to the coupled portion and the main body portion, the projecting portion having a terminal end which does not engage with the operation lever; and
   a width direction limiting portion that is formed at the operation lever and is disposed between the main body portion and the projecting portion in the seat width direction, that abuts against at least one of the main body portion or the projecting portion, and that limits movement of the rod in the seat width direction relative to the operation lever.

2. The lock release mechanism according to claim 1, further comprising an up-and-down direction limiting portion that is formed at the operation lever, that abuts against the coupled portion from each of a seat upper side and a seat lower side thereof, and that limits movement of the rod in the seat up-and-down direction relative to the operation lever.

3. The lock release mechanism according to claim 1, wherein:
   the width direction limiting portion includes a pair of abutting portions that are disposed between the main body portion and the projecting portion in the seat width direction, and that abut against each of the main body portion and the projecting portion, and
   the pair of abutting portions are deformable to bend in directions approaching one another in the seat width direction.

4. The lock release mechanism according to claim 3, wherein the pair of abutting portions are arranged with a spacing therebetween that is wider than a spacing between the main body portion and the projecting portion.

5. The lock release mechanism according to claim 1, wherein:

the coupled portion is curved in a circular arc shape, and
the rod is inserted into a hole formed in the operation lever, starting from the projecting portion, to couple the coupled portion to the operation lever.

6. The lock release mechanism according to claim 1, wherein:
the width direction limiting portion includes a pair of abutting portions that are disposed between the main body portion and the projecting portion in the seat width direction, and that abut against at least one of the main body portion or the projecting portion, and
the pair of abutting portions are arranged with a spacing therebetween that is the same as or smaller than a spacing between the main body portion and the projecting portion.

7. A lock release mechanism comprising:
an operation lever provided at a shoulder of a seatback of a vehicle seat, the operation lever being supported to be tiltable in a seat front-and-rear direction about an axis along a seat width direction;
a rod that is elongated along a seat up-and-down direction, wherein the rod comprises:
a coupled portion formed at an upper portion of the rod, the coupled portion being coupled to the operation lever to be tiltable about an axis along the seat width direction;
a main body portion that is formed at the rod and extends toward a seat lower side from one side, in the seat width direction, of the coupled portion, the main body portion moving a lock member and releasing the lock member from a state of being locked to a vehicle body when the operation lever is operated to be tilted toward a seat front; and
a projecting portion that is formed at the rod and projects toward the seat lower side at another side, in the seat width direction, of the coupled portion relative to the coupled portion and the main body portion; and
a width direction limiting portion that is formed at the operation lever and is disposed between the main body portion and the projecting portion in the seat width direction, that abuts against at least one of the main body portion or the projecting portion, and that limits movement of the rod in the seat width direction relative to the operation lever,
wherein:
the width direction limiting portion includes a pair of abutting portions that are disposed between the main body portion and the projecting portion in the seat width direction, and that abut against each of the main body portion and the projecting portion,
the pair of abutting portions are deformable to bend in directions approaching one another in the seat width direction, and
the pair of abutting portions are arranged with a spacing therebetween that is wider than a spacing between the main body portion and the projecting portion.

* * * * *